(12) United States Patent
Fujiwara et al.

(10) Patent No.: US 12,291,165 B2
(45) Date of Patent: May 6, 2025

(54) STEERING COLUMN DEVICE

(71) Applicants: FUJI KIKO CO., LTD., Kosai (JP); JTEKT CORPORATION, Kariya (JP)

(72) Inventors: Kazuki Fujiwara, Toyohashi (JP); Takuya Adachi, Toyohashi (JP); Masayoshi Sakuda, Kashihara (JP)

(73) Assignees: JTEKT COLUMN SYSTEMS CORPORATION, Kosai (JP); JTEKT CORPORATION, Kariya (JP)

( * ) Notice: Subject to any disclaimer, the term of this patent is extended or adjusted under 35 U.S.C. 154(b) by 195 days.

(21) Appl. No.: 17/906,880

(22) PCT Filed: Mar. 23, 2021

(86) PCT No.: PCT/JP2021/012043
§ 371 (c)(1),
(2) Date: Sep. 21, 2022

(87) PCT Pub. No.: WO2021/193655
PCT Pub. Date: Sep. 30, 2021

(65) Prior Publication Data
US 2023/0150451 A1 May 18, 2023

(30) Foreign Application Priority Data
Mar. 27, 2020 (JP) ................................ 2020-057862

(51) Int. Cl.
*B60R 25/02* (2013.01)
*B60R 25/021* (2013.01)

(52) U.S. Cl.
CPC .............................. *B60R 25/02115* (2013.01)

(58) Field of Classification Search
CPC B60R 25/02; B60R 25/02115; Y10T 70/5956
(Continued)

(56) References Cited

U.S. PATENT DOCUMENTS 3,914,967 A * 10/1975 Arman .............. B60R 25/02121
70/252
5,211,042 A * 5/1993 Watanuki .......... B60R 25/02126
70/252
(Continued)

FOREIGN PATENT DOCUMENTS

CN 206598872 U 10/2017
DE 103 26 120 A1 1/2005
(Continued)

OTHER PUBLICATIONS

International Search Report issued May 11, 2021 in PCT/JP2021/012043, filed on Mar. 23, 2021, 2 pages.
(Continued)

*Primary Examiner* — Suzanne L Barrett
(74) *Attorney, Agent, or Firm* — Oblon, McClelland, Maier & Neustadt, L.L.P.

(57) ABSTRACT

A steering shaft is rotatably provided inside an outer column and an inner column. A key lock collar is mounted on an outer peripheral surface of the steering shaft, the outer peripheral surface facing the outer column. The key lock collar includes a key lock collar body and a cylindrical portion. Multiple concave parts and convex parts extending in the axial direction are provided on an outer peripheral part of the key lock collar body along the circumferential direction. A lock key is engaged with the concave parts from adjacent to the outer column, and thus the rotation of the steering shaft with respect to the outer column is restricted. An outer diameter of the cylindrical portion is smaller than an outer diameter of the convex parts and larger than an outer diameter of the concave parts.

9 Claims, 7 Drawing Sheets

(58) Field of Classification Search
USPC .......................................................... 70/252
See application file for complete search history.

(56) References Cited

U.S. PATENT DOCUMENTS

| | | | | |
|---|---|---|---|---|
| 5,937,500 | A | * | 8/1999 | Bobbitt, III ............... F16C 3/02 29/516 |
| 2006/0272370 | A1 | | 12/2006 | Yamada et al. |

FOREIGN PATENT DOCUMENTS

| | | | | |
|---|---|---|---|---|
| EP | 0 035 415 A1 | | 9/1981 | |
| GB | 2298837 A | * | 9/1996 | ....... B60R 25/02107 |
| JP | 2007-153093 A | | 6/2007 | |
| JP | 2017-222241 A | | 12/2017 | |
| KR | 10-2014-0135328 A | | 11/2014 | |

OTHER PUBLICATIONS

Extended European Search Report issued Aug. 18, 2023 in European Application 21776858.9, 6 pages.

\* cited by examiner

STEERING COLUMN DEVICE

TECHNICAL FIELD

The present disclosure relates to a steering column device including a lock mechanism that restricts rotation of a steering shaft.

BACKGROUND ART

Steering column devices are provided with a lock mechanism that prevents the steering wheel from rotating to prevent automobile theft. In the lock mechanism, when an ignition key is set to a lock position and a key is pulled out, a lock key on the steering column side engages with a key lock collar mounted on the outer periphery of a steering shaft and is locked.

However, if the steering wheel is forced to rotate with a strong force while the steering shaft is locked, the lock key may be broken and the function of the lock mechanism may be lost, thereby impairing the function as an antitheft device. Thus, there is a known steering device in which, when a large torque is applied, the steering shaft slips and rotates with respect to the key lock collar while receiving a frictional force (slip torque), thereby preventing the lock key from being broken (see Patent Literature 1).

CITATION LIST

Patent Literature

Patent Literature 1: Japanese Unexamined Patent Application Publication No. 2007-153093

BRIEF SUMMARY

It is necessary to set the above-described frictional force generated between the outer peripheral surface of the steering shaft and the inner peripheral surface of the key lock collar to an appropriate value that is insufficient to destroy the lock key in the locked state but does not interfere with the steering operation in the unlocked state.

Thus, it is an object of the present disclosure to implement an appropriate frictional force generated between the outer peripheral surface of the steering shaft and the inner peripheral surface of the key lock collar.

A steering column device according to an aspect of the present disclosure includes a shaft support member in a cylindrical shape provided on a vehicle body side, and a steering shaft rotatably provided inside the shaft support member. The steering column device includes a key lock collar mounted on an outer peripheral surface of the steering shaft, the outer peripheral surface facing the shaft support member, the key lock collar including a plurality of concave parts each extending in an axial direction on an outer peripheral part thereof and a plurality of convex parts formed between the concave parts along a circumferential direction. The steering column device includes a lock key provided on the shaft support member and restricting rotation of the steering shaft with respect to the shaft support member by making a tip part thereof engage with the concave parts of the key lock collar. The key lock collar includes a key lock collar body including the plurality of concave parts and the plurality of convex parts, and a cylindrical portion provided adjacent in the axial direction to the key lock collar body, and an outer diameter of the cylindrical portion is smaller than an outer diameter of a circle including tip surfaces of the plurality of convex parts and larger than an outer diameter of a circle including outside surfaces of the plurality of concave parts.

The present disclosure makes it possible to implement an appropriate frictional force generated between the outer peripheral surface of the steering shaft and the inner peripheral surface of the key lock collar.

DESCRIPTION OF EMBODIMENTS

Figure 1:
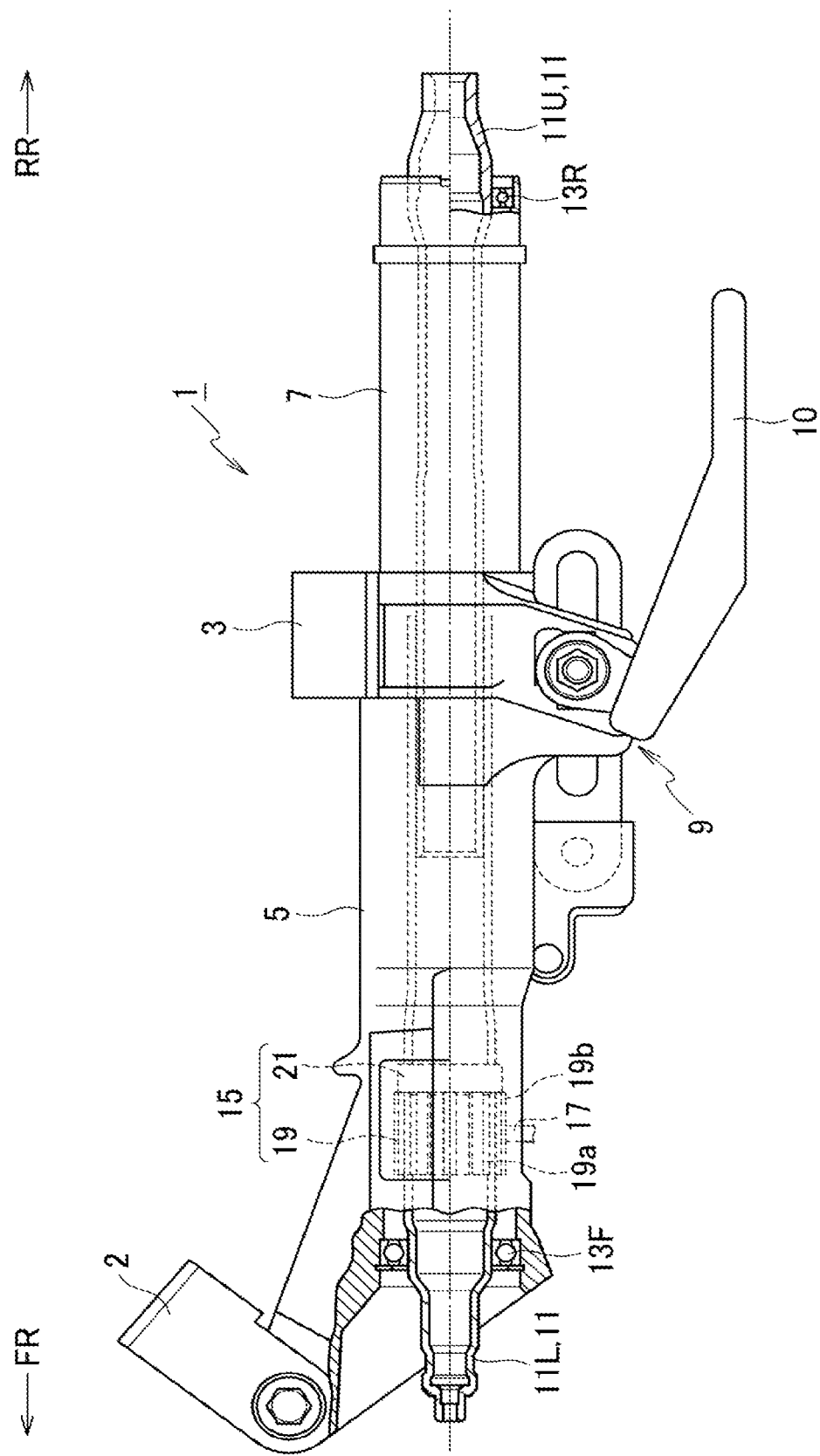
FIG. 1 is a left side view of a steering column device according to an embodiment.
Figure 2:
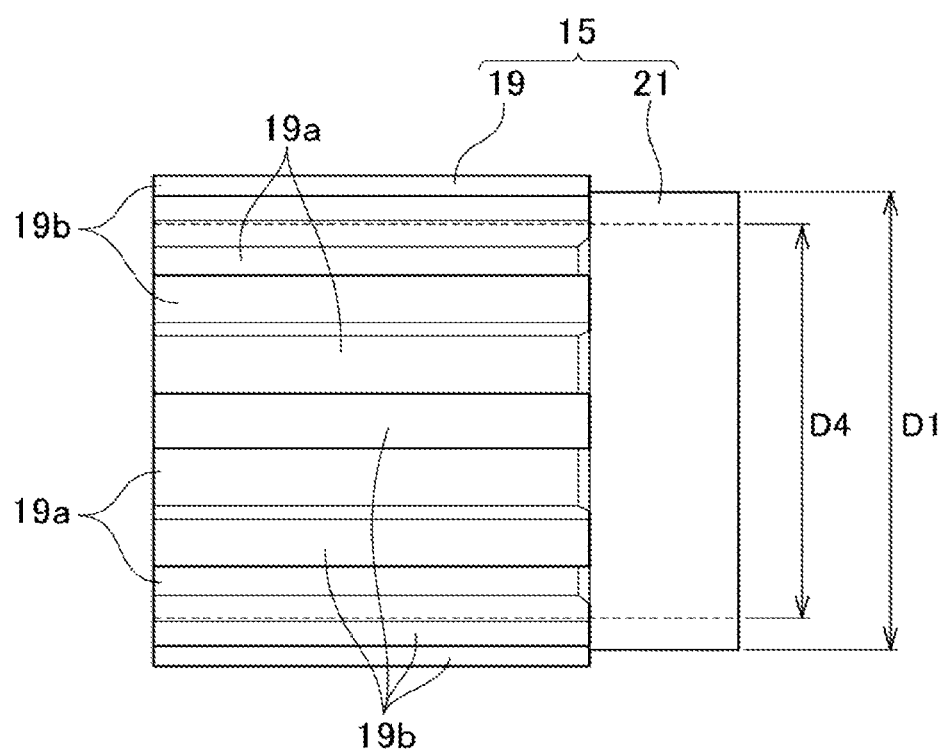
FIG. 2 is a side view of a key lock collar used in the steering column device in FIG. 1.

Embodiments according to the present disclosure are described below with reference to the drawings. Note that in the drawings, the front of the vehicle is indicated by an arrow FR, and the rear of the vehicle is indicated by an arrow RR.

As illustrated in FIG. 1, a steering column device 1 includes two front and rear vehicle body mounting brackets 2 and 3 for fixing to a vehicle body. An outer column 5 is supported by the vehicle body mounting brackets 2, 3 to be freely swingable (freely adjustable in tilt position) in the vertical direction of the vehicle body. An inner column 7 is supported by the outer column 5 to be freely movable (freely adjustable in telescopic position) in the longitudinal direction of the vehicle body.

A lock portion 9 tightens and locks the vehicle body mounting bracket 3, the outer column 5, and the inner column 7 by an operation lever 10 being pushed up and unlocks them by the operation lever 10 being pushed down. The tilt position or the telescopic position is adjusted when the lock portion 9 is in the unlocked state, and the tilt position or the telescopic position is fixed by setting the lock portion 9 in the locked state after the adjustment.

A steering shaft 11 is rotatably supported in the inner column 7 and the outer column 5 through a pair of front and rear bearings 13F and 13R. A steering wheel, which is not illustrated, is mounted on the rear end of the steering shaft 11. The steering shaft 11 includes a lower shaft 11L housed in the outer column 5 and an upper shaft 11U housed in the inner column 7.

By connecting the upper shaft 11U and the lower shaft 11L with a spline, the upper shaft 11U and the lower shaft 11L rotate as one body on an axis with respect to the outer column 5 and the inner column 7. In the axial direction, the upper shaft 11U is movable relative to the lower shaft 11L. That is, at the time of the telescopic position adjustment described above, the inner column 7 and the upper shaft 11U move as one body forward and backward with respect to the outer column 5 and the lower shaft 11L.

A key lock collar 15 having a cylindrical shape as a whole is mounted on the outer peripheral surface of the lower shaft 11L. The key lock collar 15 is between the front bearing 13F and the front end of the upper shaft 11U and is closer to the bearing 13F than the front end of the upper shaft 11U, at a position facing the inner peripheral surface of the outer column 5. The key lock collar 15 is made from a metal material having elasticity such as carbon steel for mechanical structures.

A lock key 17 that is engaged with the key lock collar 15 is movably mounted on the outer column 5 toward the axis of the key lock collar 15. When a key is pulled out with an ignition key in a lock position, the front end of the lock key 17 is engaged with and locked to the key lock collar 15. The engagement of the lock key 17 with the key lock collar 15 restricts the rotation of the steering shaft 11 with respect to the outer column 5. Thus, the lock mechanism including the key lock collar 15 and the lock key 17 functions as an antitheft device. The outer column 5 constitutes a cylindrical shaft support member provided on the vehicle body side. Note that the lock key 17 in FIG. 1 is positioned at the lower part for ease of understanding, but is not limited to the position in FIG. 1 and is provided at an optimum position in the circumferential direction.

Next, the key lock collar 15 is described with reference to FIGS. 2 to 7.

The key lock collar 15 includes a key lock collar body 19 occupying most of the key lock collar 15 in the axial direction, and a cylindrical portion 21 provided adjacent in the axial direction to the key lock collar body 19. The cylindrical portion 21 is positioned closer to the rear of the vehicle body than the key lock collar body 19 and is shorter in the axial direction than the key lock collar body 19. The key lock collar body 19 includes concave parts 19a and convex parts 19b alternately formed on the outer peripheral part along the circumferential direction. That is, each convex part 19b is formed between two concave parts 19a. The concave parts 19a and the convex parts 19b extend along the axial direction and are each formed at equal intervals along the circumferential direction.

Figure 3:
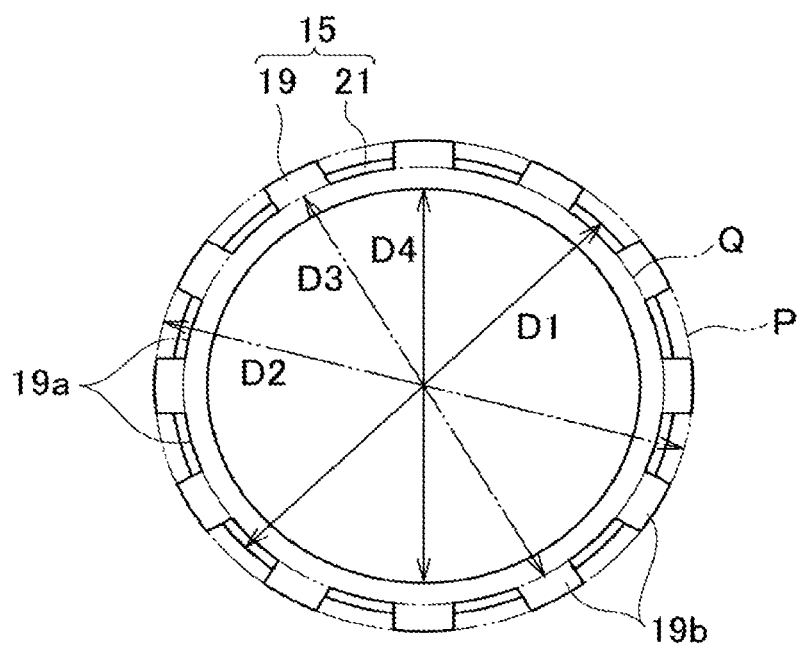
FIG. 3 is a left side view of FIG. 2.
Figure 4:
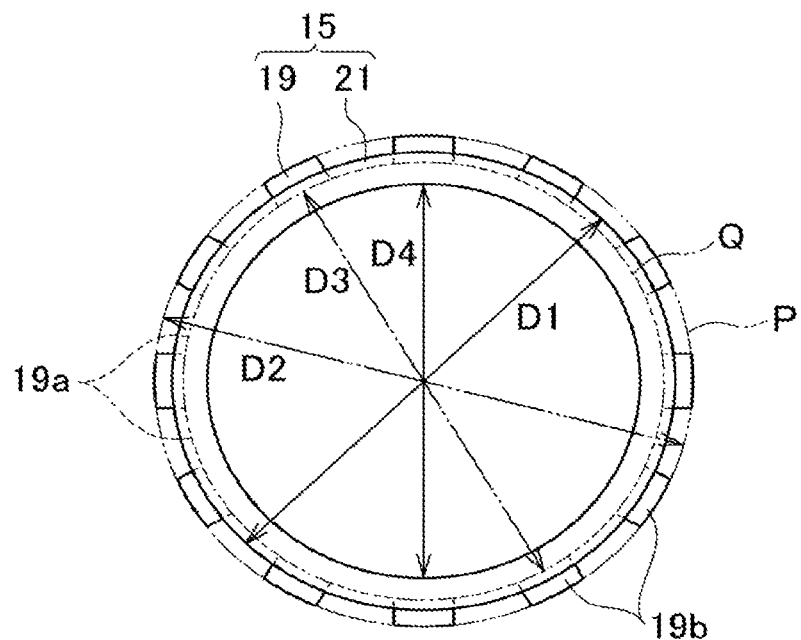
FIG. 4 is a right side view of FIG. 2.

As illustrated in FIGS. 3 and 4, an outer diameter $D1$ of the cylindrical portion 21 is smaller than an outer diameter $D2$ of the convex parts 19b and larger than an outer diameter $D3$ of the concave part 19a ($D2>D1>D3$). The key lock collar 15 has an inner diameter $D4$, which is constant in the whole axial direction over the key lock collar body 19 and the cylindrical portion 21. Note that the outer diameter $D2$ of the convex parts 19b corresponds to the diameter of a circle P including the tip surfaces of the convex parts 19b, and the outer diameter $D3$ of the concave parts 19a corresponds to the diameter of a circle Q including the outer surfaces of the concave parts 19a.

In the key lock collar 15, the concave parts 19a and the convex parts 19b are formed on the outer peripheral surface through plastic working (cold forging) in which a mold is pushed into a cylindrical material having circular outer and inner peripheral surfaces. Specifically, while the material is set in one die with one end in the axial direction open, the other die having multiple press-in convex parts for forming the concave parts 19a on the inner peripheral surface of the cylindrical portion along the circumferential direction is moved along the axial direction. When the press-in convex parts move to draw the outer peripheral surface of the material along the axial direction to form the concave parts 19a, the excess wall generated in the drawing becomes a part of the cylindrical portion 21. After the plastic working, finish processing is appropriately performed on the key lock collar 15 to have a desired shape as a whole.

The inner diameter $D4$ of the key lock collar 15 is formed slightly larger than the outer diameter of the lower shaft 11L, and a tolerance ring 23 in a substantially cylindrical shape is provided between the key lock collar 15 and the lower shaft 11L. The tolerance ring 23 is formed by bending an elastically deformable belt-shaped metal plate into an approximate C-shape, and a spring-shaped part 23a made from a concavo-convex part is formed on the inner and outer peripheral surfaces.

Figure 7:
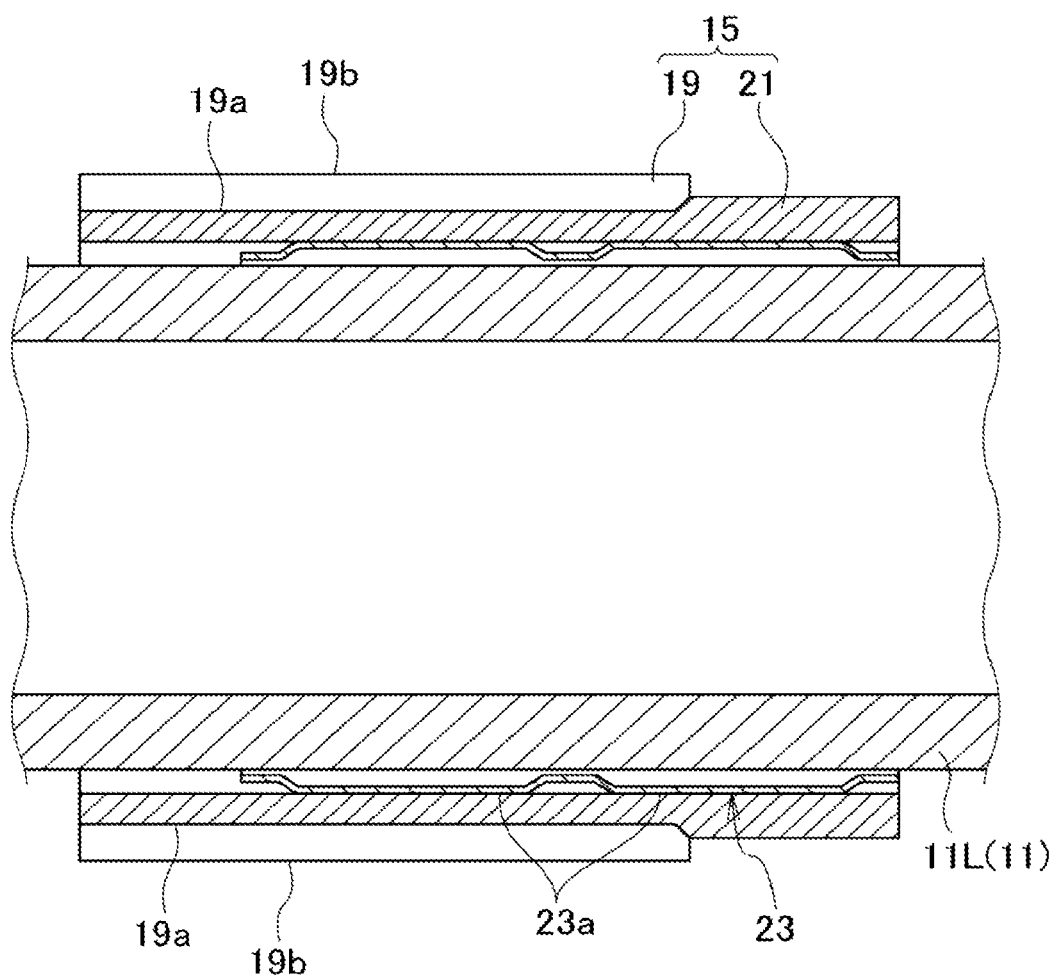
FIG. 7 is a cross-sectional view of a portion corresponding to the key lock collar in FIG. 6, along the axis.

The tolerance ring 23 is elastically deformed radially outward while being assembled between the key lock collar 15 and the lower shaft 11L. The spring-shaped portion 23a of the tolerance ring 23 is compressed between the key lock collar 15 and the lower shaft 11L, thereby generating a frictional force (slip torque) F between the key lock collar 15 and the lower shaft 11L. As illustrated in FIG. 7, the tolerance ring 23 has an axial length slightly shorter than that of the key lock collar 15 but may be equal.

When the lock key 17 enters the concave parts 19a of the key lock collar 15, the steering shaft 11 is locked and its rotation is restricted, resulting in a locked state. When the steering shaft 11 in the locked state is forcibly rotated by a strong force, the steering shaft 11 slides and rotates while receiving the frictional force F against the key lock collar 15 to prevent the breakage of the lock key 17.

It is necessary to set the frictional force F here appropriately. That is, if the frictional force F is larger than an appropriate value, the lock key 17 in the locked state is broken, and if it is smaller than the appropriate value, the steering shaft 11 is easily rotated in spite of being locked. In other words, the frictional force F needs to be insufficient to destroy the lock key 17 but to be large enough to enable the steering operation necessary for driving the automobile.

Figure 5:
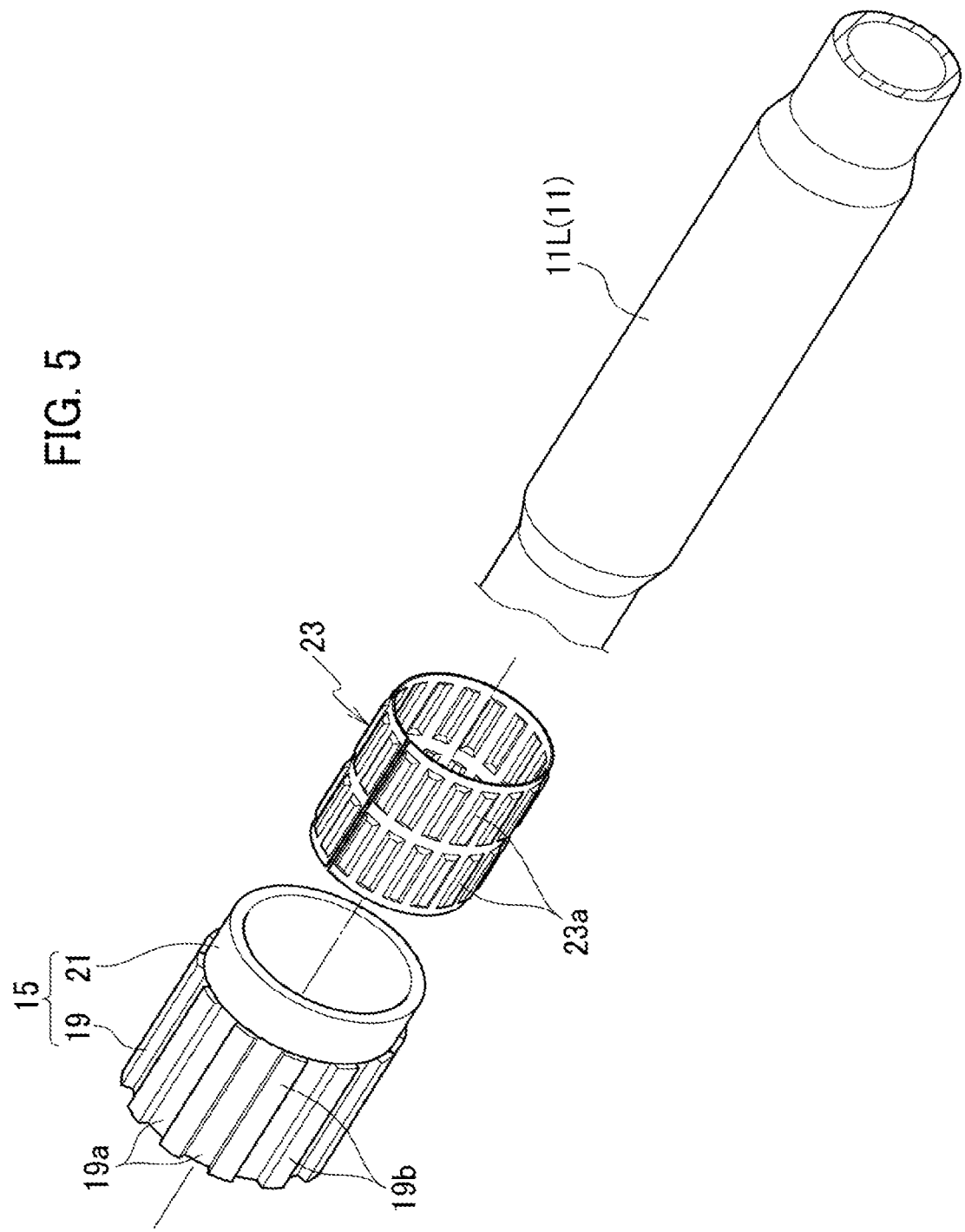
FIG. 5 is an exploded perspective view including a steering shaft and a tolerance ring on which the key lock collar in FIG. 2 is mounted.
Figure 6:
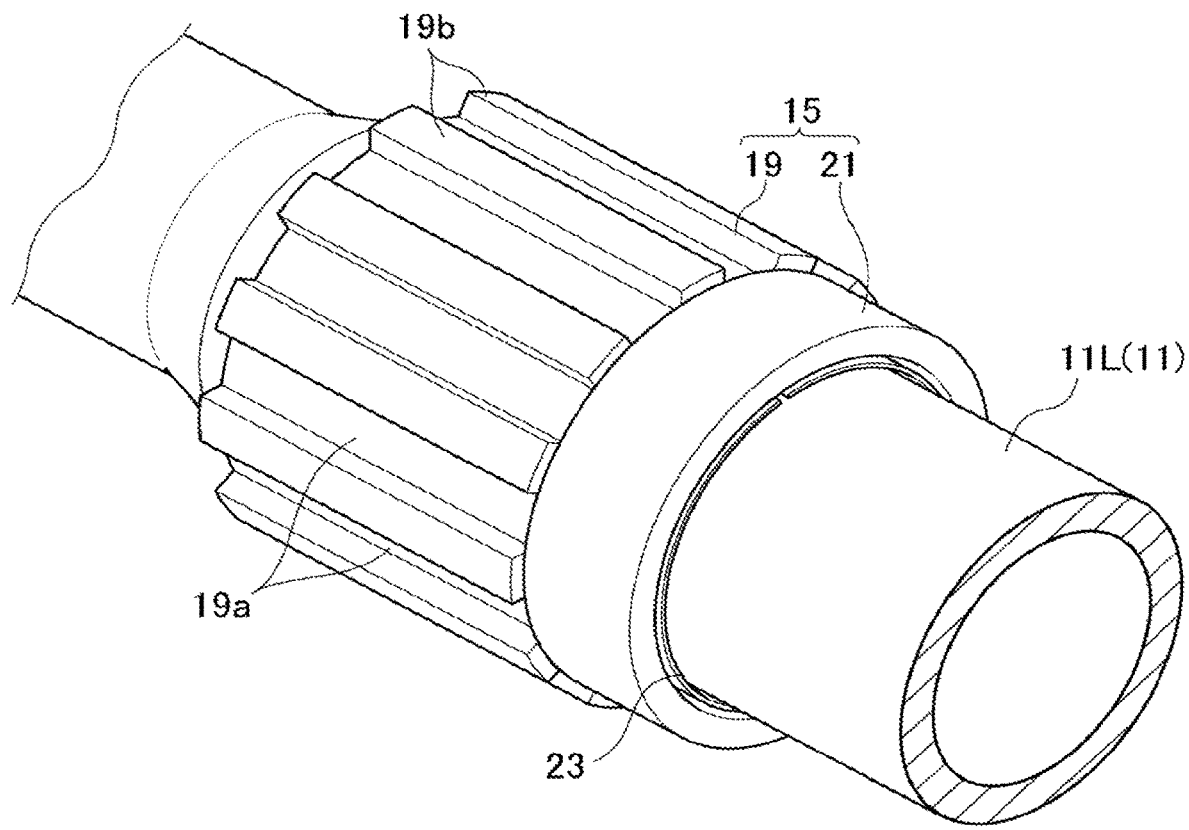
FIG. 6 is an assembly diagram illustrating the key lock collar, the steering shaft, and the tolerance ring in FIG. 5.

The tolerance ring 23 illustrated in FIG. 5 is inserted into the key lock collar 15 as illustrated in FIG. 6 while being assembled to the lower shaft 11L. In the tolerance ring 23 after insertion, the spring-shaped portion 23a may be positioned to face both the key lock collar body 19 and the cylindrical portion 21 as illustrated in FIG. 7. In this case, if the outer diameter $D1$ of the cylindrical portion 21 is equal to the outer diameter $D2$ of the convex parts 19b, and if the axial length of the cylindrical portion 21 is also equal to that of the key lock collar body 19, the rigidity of the cylindrical portion 21 is higher than that of the key lock collar body 19. Since the concave parts 19a are formed on the key lock collar body 19, the rigidity thereof tends to be lower than that of the cylindrical portion 21.

In this state, when the tolerance ring 23 is assembled between the lower shaft 11L and the key lock collar 15, the amounts of elastic deformation of the tolerance ring 23 are different between a portion facing the cylindrical portion 21 (referred to as a cylinder facing part below) having high rigidity and a portion facing the key lock collar body 19 (referred to as a body facing part below) having low rigidity. If the elastic deformation amounts are different, the above-described frictional force F changes between the cylindrical portion 21 and the key lock collar body 19, and a stable frictional force F cannot be obtained.

Then, in the present embodiment, the rigidity of the cylindrical portion 21 is adjusted by changing the outer diameter of the cylindrical portion 21, and the frictional force F is made substantially uniform at the cylindrical portion 21 and at the key lock collar body 19. Specifically, as described above, the outer diameter $D1$ of the cylindrical portion 21 is made smaller than the outer diameter D2 of the convex parts 19b and larger than the outer diameter D3 of the concave parts 19a. The cylindrical portion 21 and the key lock collar body 19 have the same inner diameter D4. Thus, the cylindrical portion 21 is thinner than a part thereof corresponding to the convex parts 19b and thicker than a part thereof corresponding to the concave parts 19a in thickness.

As described above, adjusting the outer diameter of the cylindrical portion 21 enables the rigidity of the cylindrical portion 21 to be made close to that of the key lock collar body 19, and the rigidity of the cylindrical portion 21 and the rigidity of the key lock collar body 19 to be made substantially uniform. Thus, the elastic deformation amounts of the tolerance ring 23 at the time of assembly are substantially equal at the cylinder facing part and at the body facing part. Consequently, the frictional force F is made substantially uniform at the cylindrical portion 21 and at the key lock collar body 19, thereby providing a stable frictional force F.

Note that the difference in rigidity between the cylindrical portion 21 and the key lock collar body 19 is also influenced by the axial length of each part. In the present embodiment, the cylindrical portion 21 is shorter than the key lock collar body 19 in the axial length. Thus, adjusting the axial length of the cylindrical portion 21 within the above-described range of the length setting provides the rigidity in consideration of the axial length for the cylindrical portion 21.

In the present embodiment, the frictional force F is adjusted through changing the shape of the cylindrical portion 21. Thus, when the frictional force F is adjusted, even when the inner diameter D4 of the key lock collar 15, the outer diameter D3 of the part corresponding to the concave parts 19a, or the like cannot be changed due to the structure of the other parts, the adjustment can be easily performed.

In the present embodiment, the tolerance ring 23 is provided between the key lock collar 15 and the steering shaft 11. Thus, even when the frictional force F is generated using the tolerance ring 23, the frictional force F can be made substantially uniform along the axial direction through adjusting the outer diameter, the axial length, and the like of the cylindrical portion 21 so that the rigidity of the cylindrical portion 21 and the key lock collar body 19 is substantially uniform.

In the key lock collar 15 in the present embodiment, the axial length of the cylindrical portion 21 is set shorter than that of the key lock collar body 19. When the axial lengths of the cylindrical portion 21 and the key lock collar body 19 are equal to each other, the key lock collar body 19 has lower rigidity than the cylindrical portion 21 because the concave parts 19a are formed thereon.

Thus, shortening the cylindrical portion 21 in the axial direction, which tends to be higher in rigidity than the key lock collar body 19, which tends to be lower in rigidity, enables the rigidity of the cylindrical portion 21 and the rigidity of the key lock collar body 19 to be made substantially equal. Consequently, the elastic deformation amounts of the tolerance ring 23 at the time of assembly are substantially equal at the cylinder facing part and at the body facing part, and the frictional force F is made substantially uniform at the cylindrical portion 21 and at the key lock collar body 19, thereby providing a stable frictional force F.

Note that the difference in rigidity between the cylindrical portion 21 and the key lock collar body 19 is also influenced by the thickness of each part. In the present embodiment, the cylindrical portion 21 is made thinner than the part corresponding to the convex parts 19b and thicker than the part corresponding to the concave parts 19a. Thus, adjusting the thickness of the cylindrical portion 21 in the above-described range of thickness setting provides the rigidity in consideration of thickness.

Next, other embodiments are described with reference to FIGS. 8 and 9.

Figure 8:
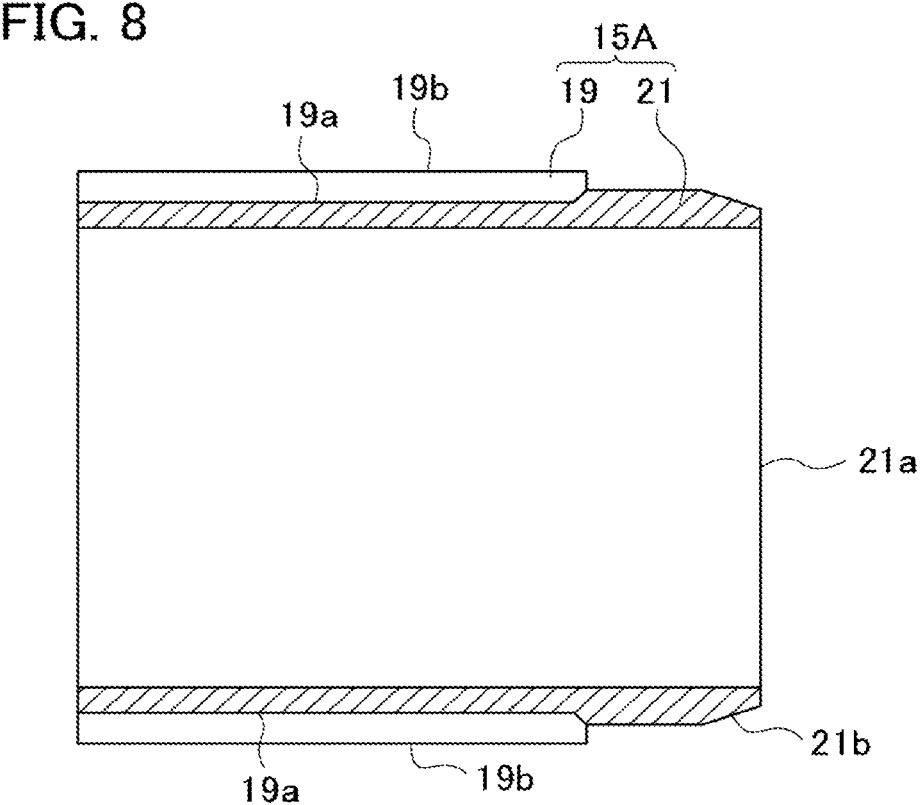
FIG. 8 is a cross-sectional view of a key lock collar according to another embodiment.
Figure 9:
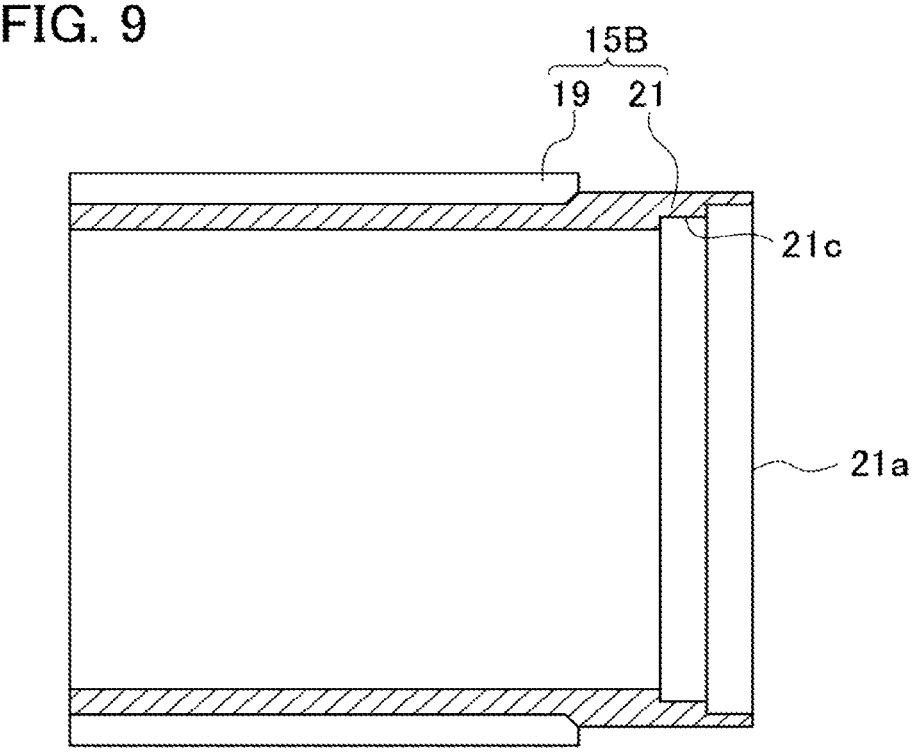
FIG. 9 is a cross-sectional view of a key lock collar according to yet another embodiment.

In the embodiments illustrated in FIGS. 8 and 9, each cylindrical portion 21 of key lock collars 15A and 15B has a thickness that is made non-uniform. Thus, the rigidity of the cylindrical portion 21 is adjusted so that the rigidity of the cylindrical portion 21 and the rigidity of the key lock collar body 19 are substantially equal to each other. Consequently, the elastic deformation amounts of the tolerance ring 23 at the time of assembly are substantially equal at the cylinder facing part and at the body facing part, and the frictional force F is made substantially uniform at the cylindrical portion 21 and at the key lock collar body 19, thereby providing a stable frictional force F.

In the embodiments illustrated in FIGS. 8 and 9, each cylindrical portion 21 of the key lock collars 15A and 15B is made thinner at a part thereof opposite to a part thereof adjacent to the key lock collar body 19 than the part thereof adjacent to the key lock collar body 19. Thus, the rigidity of the cylindrical portion 21 is adjusted so that the rigidity of the cylindrical portion 21 and the rigidity of the key lock collar body 19 are substantially equal to each other. Consequently, the elastic deformation amounts of the tolerance ring 23 at the time of assembly are substantially equal at the cylinder facing part and at the body facing part, and the frictional force F is made substantially uniform at the cylindrical portion 21 and at the key lock collar body 19, thereby providing a stable frictional force F.

In the embodiments illustrated in FIGS. 8 and 9, the thickness of each cylindrical portion 21 of the key lock collars 15A and 15B gradually decreases from the side adjacent to the key lock collar body 19 toward the side opposite to the side adjacent to the key lock collar body 19. Thus, the rigidity of the cylindrical portion 21 is adjusted so that the rigidity of the cylindrical portion 21 and the rigidity of the key lock collar body 19 are substantially equal to each other. Consequently, the elastic deformation amounts of the tolerance ring 23 at the time of assembly are substantially equal at the cylinder facing part and at the body facing part, and the frictional force F is made substantially uniform at the cylindrical portion 21 and at the key lock collar body 19, thereby providing a stable frictional force F.

In the key lock collar 15A according to the embodiment illustrated in FIG. 8, the outer peripheral surface of an end part 21a of the cylindrical portion 21 on the side opposite to the side adjacent to the key lock collar body 19 is defined as an inclined surface 21b. The inclined surface 21b inclines so that its outer diameter becomes smaller toward the end part 21a than toward the key lock collar body 19. The rigidity of the cylindrical portion 21 is adjusted through adjusting the inclination angle of the inclined surface 21b, the inclination range in the axial direction, or the like, so that the rigidity of the cylindrical portion 21 and the rigidity of the key lock collar body 19 are substantially equal to each other. Consequently, the elastic deformation amounts of the tolerance ring 23 at the time of assembly are substantially equal at the cylinder facing part and at the body facing part, and the frictional force F is made substantially uniform at the cylindrical portion 21 and at the key lock collar body 19, thereby providing a stable frictional force F.

In the key lock collar 15B according to the embodiment illustrated in FIG. 9, the inner peripheral surface of the end part 21a of the cylindrical portion 21, which is opposite to the side adjacent to the key lock collar body 19, is defined as a step part 21c formed in a step shape along the central axis direction of the cylindrical portion 21. The step part 21c is stepped to have the inner diameter larger toward the end part 21a than toward the key lock collar body 19. The step part 21c illustrated in FIG. 9 has two steps but may have one step or three or more steps.

The rigidity of the cylindrical portion 21 is adjusted through adjusting the number of steps in the step part 21c, the step range in the axial direction, or the like, so that the rigidity of the cylindrical portion 21 and the rigidity of the key lock collar body 19 are substantially equal. Consequently, the elastic deformation amounts of the tolerance ring 23 at the time of assembly are substantially equal at the cylinder facing part and at the body facing part, and the frictional force F is made substantially uniform at the cylindrical portion 21 and at the key lock collar body 19, thereby providing a stable frictional force F.

Although the embodiments according to the present disclosure have been described above, these embodiments are only illustrative to facilitate understanding of the present disclosure, and the present disclosure is not limited to these embodiments. The technical scope of the present disclosure is not limited to the specific technical matters disclosed in the above embodiments but also includes various variations, modifications, alternative techniques, and the like, which can be derived therefrom with ease.

For example, in the above-described embodiments, the key lock collar 15 is mounted on the outer peripheral surface of the lower shaft 11L but may be mounted on the outer peripheral surface of the upper shaft 11U. Here, for example, in FIG. 1, the key lock collar 15 is mounted at a position facing the inner peripheral surface of the inner column 7 (right side of the vehicle body mounting bracket 3 in FIG. 1) at a portion where the upper shaft 11U and the lower shaft 11L are not connected by the spline. Thus, the lock key 17 that is engaged with the key lock collar 15 is mounted on the inner column 7. Even when the key lock collar 15 is mounted on the upper shaft 11U, the same action and effect are obtained as when it is mounted on the lower shaft 11L.

The tolerance ring 23 according to the above-described embodiment is not limited to the C-shape in which a part in the circumferential direction is notched, and may be in a ring shape.

The tolerance ring 23 according to the above-described embodiment may not be used. In this case, the inner diameter D4 of the key lock collar 15 before assembly is made slightly smaller than the outer diameter of the lower shaft 11L. By press-fitting the lower shaft 11L into the key lock collar 15, the key lock collar 15 is elastically deformed, and the frictional force F is generated between the lower shaft 11L and the key lock collar 15. Note that chamfering the inner corner of the end part of the key lock collar 15 where the lower shaft 11L is press-fitted facilitates the press-fitting work.

Here, as described above, adjusting the outer diameter D1 of the cylindrical portion 21, the axial length, or the like makes the rigidity of the cylindrical portion 21 substantially equal to that of the key lock collar body 19. Consequently, the elastic deformation amounts of the key lock collar 15 when assembled are substantially equal at the cylindrical portion 21 and at the key lock collar body 19, and the frictional force F is substantially uniform at a part corresponding to the cylindrical portion 21 and at a part corresponding to the key lock collar body 19, thereby providing a stable frictional force F.

In the embodiment illustrated in FIG. 8, the inclined surface 21b is formed on the outer peripheral surface of the cylindrical portion 21, but the inclined surface may be formed on the inner peripheral surface of the cylindrical portion 21 or may be formed on both the outer peripheral surface and the inner peripheral surface of the cylindrical portion 21. In the embodiment illustrated in FIG. 9, the step part 21c is formed on the inner peripheral surface of the cylindrical portion 21, but the step part may be formed on the outer peripheral surface of the cylindrical portion 21 or may be formed on both the outer peripheral surface and the inner peripheral surface of the cylindrical portion 21. The inclined surface and the stepped part may be combined. For example, the inclined surface may be provided on the outer peripheral surface of the cylindrical portion 21, and the step part may be provided on the inner peripheral surface of the cylindrical portion 21.

For the configuration in which the thickness of the cylindrical portion 21 is non-uniform, a recessed part may be formed on at least one of the inner peripheral surface or the outer peripheral surface of the cylindrical portion 21 to provide a partially thin-walled part. Alternatively, at least one of the inner peripheral corner part or the outer peripheral corner part of the end part of the cylindrical portion 21, which is opposite to the part adjacent to the key lock collar body 19, may be chamfered.

REFERENCE SIGNS LIST

5 Outer column (shaft support member)
11 Steering shaft
15 Key lock collar
17 Lock key
19 Key lock collar body
19a Concave parts of key lock collar body
19b Convex parts of key lock collar body
21 Cylindrical portion of key lock collar
21b Inclined surface of cylindrical portion
23 Tolerance ring
D1 Outer diameter of cylindrical portion
D2 Outer diameter of convex parts
D3 Outer diameter of concave parts
D3 of the concave parts 19a.

The invention claimed is:

1. A steering column device, comprising:
a shaft support member in a cylindrical shape provided adjacent to a vehicle body;
a steering shaft rotatably provided inside the shaft support member;
a key lock collar mounted on an outer peripheral surface of the steering shaft, the outer peripheral surface facing the shaft support member, the key lock collar including a plurality of concave parts each extending in an axial direction on an outer peripheral part thereof and a plurality of convex parts formed between the concave parts along a circumferential direction; and
a lock key provided on the shaft support member and restricting rotation of the steering shaft with respect to the shaft support member by making a tip part of the lock key engage with the concave parts of the key lock collar, wherein
the key lock collar includes a key lock collar body including the plurality of concave parts and the plurality of convex parts, and a cylindrical portion provided adjacent in the axial direction to the key lock collar body,
an outer diameter of the cylindrical portion is smaller than an outer diameter of a circle including tip surfaces of the plurality of convex parts and larger than an outer diameter of a circle including outside surfaces of the plurality of concave parts, and a rigidity of the cylindrical portion and a rigidity of the key lock collar body are substantially equal.

2. The steering column device according to claim 1, wherein in the key lock collar, an axial length of the cylindrical portion is shorter than an axial length of the key lock collar body.

3. The steering column device according to claim 1, wherein in the key lock collar, the cylindrical portion has a thickness that is non-uniform.

4. The steering column device according to claim 3, wherein the cylindrical portion is thinner at a part thereof opposite to a part thereof adjacent to the key lock collar body than the part thereof adjacent to the key lock collar body.

5. The steering column device according to claim 4, wherein the thickness of the cylindrical portion gradually decreases from the part thereof adjacent to the key lock collar body toward the part thereof opposite to the part thereof adjacent to the key lock collar body.

6. The steering column device according to claim 5, wherein at least one of an inner peripheral surface or an outer peripheral surface of the cylindrical portion is formed as an inclined surface that is inclined with respect to an axis of the cylindrical portion.

7. The steering column device according to claim 5, wherein at least one of an inner peripheral surface or an outer peripheral surface of the cylindrical portion is formed in a stepped shape along an axial direction of the cylindrical portion.

8. The steering column device according to claim 1, wherein a tolerance ring is provided between the key lock collar and the steering shaft.

9. The steering column device according to claim 8, wherein the tolerance ring is elastically deformed radially outward while being assembled between the key lock collar and the steering shaft, the tolerance ring including a spring-shaped portion that is compressed between the key lock collar and the steering shaft.

* * * * *